(12) United States Patent
Inagaki

(10) Patent No.: US 12,389,116 B2
(45) Date of Patent: Aug. 12, 2025

(54) FOCUS CONTROL APPARATUS, IMAGE PICKUP APPARATUS, AND FOCUS CONTROL METHOD

(71) Applicant: CANON KABUSHIKI KAISHA, Tokyo (JP)

(72) Inventor: Yu Inagaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 125 days.

(21) Appl. No.: 18/498,433

(22) Filed: Oct. 31, 2023

(65) Prior Publication Data
US 2024/0171858 A1    May 23, 2024

(30) Foreign Application Priority Data
Nov. 17, 2022   (JP) ................. 2022-184290

(51) Int. Cl.
*H04N 23/67* (2023.01)
(52) U.S. Cl.
CPC ................. *H04N 23/675* (2023.01)
(58) Field of Classification Search
CPC ... H04N 23/672; H04N 23/673; H04N 23/675
USPC .......................................................... 348/345
See application file for complete search history.

(56) References Cited

U.S. PATENT DOCUMENTS

| | | | | |
|---|---|---|---|---|
| 10,477,094 B2* | 11/2019 | Maruyama | ............. | H04N 23/67 |
| 10,547,779 B2* | 1/2020 | Wan | .................... | H04N 23/672 |
| 11,012,609 B2* | 5/2021 | Shimizu | ............... | H04N 23/675 |
| 11,490,000 B2* | 11/2022 | Feng | .................... | H04N 23/672 |
| 11,877,051 B2* | 1/2024 | Inagaki | ................ | H04N 23/611 |
| 2013/0182171 A1* | 7/2013 | Kawanishi | ........... | H04N 23/663 |
| | | | | 348/345 |
| 2015/0323760 A1* | 11/2015 | Tomosada | ................ | G02B 7/28 |
| | | | | 250/201.2 |
| 2016/0295101 A1* | 10/2016 | Ogino | .................. | H04N 23/611 |
| 2016/0301854 A1* | 10/2016 | Kato | ..................... | G02B 15/143 |
| 2017/0289438 A1* | 10/2017 | Maruyama | ............. | G03B 13/36 |
| 2017/0343768 A1* | 11/2017 | Shirai | ..................... | G03B 13/36 |
| 2018/0081148 A1* | 3/2018 | Tomita | ................... | G03B 17/14 |
| 2018/0213172 A1* | 7/2018 | Ohtsubo | ................ | G02B 7/34 |
| 2019/0335089 A1* | 10/2019 | Kadambala | ............ | G06V 10/25 |
| 2020/0228719 A1* | 7/2020 | Kimoto | .................. | H04N 23/69 |

(Continued)

FOREIGN PATENT DOCUMENTS

JP    2007-164051 A    6/2007

*Primary Examiner* — Pritham D Prabhakher
(74) *Attorney, Agent, or Firm* — Cowan, Liebowitz & Latman, P.C.

(57) ABSTRACT

A focus control apparatus preforms a focus detection using a phase-difference detecting method, and controls a drive of a focus lens included in an optical system based on a focus detection result acquired by the focus detection. The focus control apparatus sets, in a search operation of acquiring the focus detection result while driving the focus lens in a search direction, a movable range of the focus lens based on the search direction and a position of the focus lens, in a case where the focus detection result for a position within the movable range is acquired, drives the focus lens based on the focus detection result, and in a case where the focus detection result for a position outside the movable range is acquired, drives the focus lens in the search direction without using the focus detection result.

15 Claims, 15 Drawing Sheets

(56) References Cited

U.S. PATENT DOCUMENTS

| | | | |
|---|---|---|---|
| 2020/0271765 A1* | 8/2020 | Glover | G01S 7/4876 |
| 2022/0116545 A1* | 4/2022 | Feng | H04N 23/80 |
| 2022/0353431 A1* | 11/2022 | Inagaki | H04N 23/611 |

* cited by examiner

BACKGROUND-FOCUSED
STATE

OBJECT-FOCUSED STATE

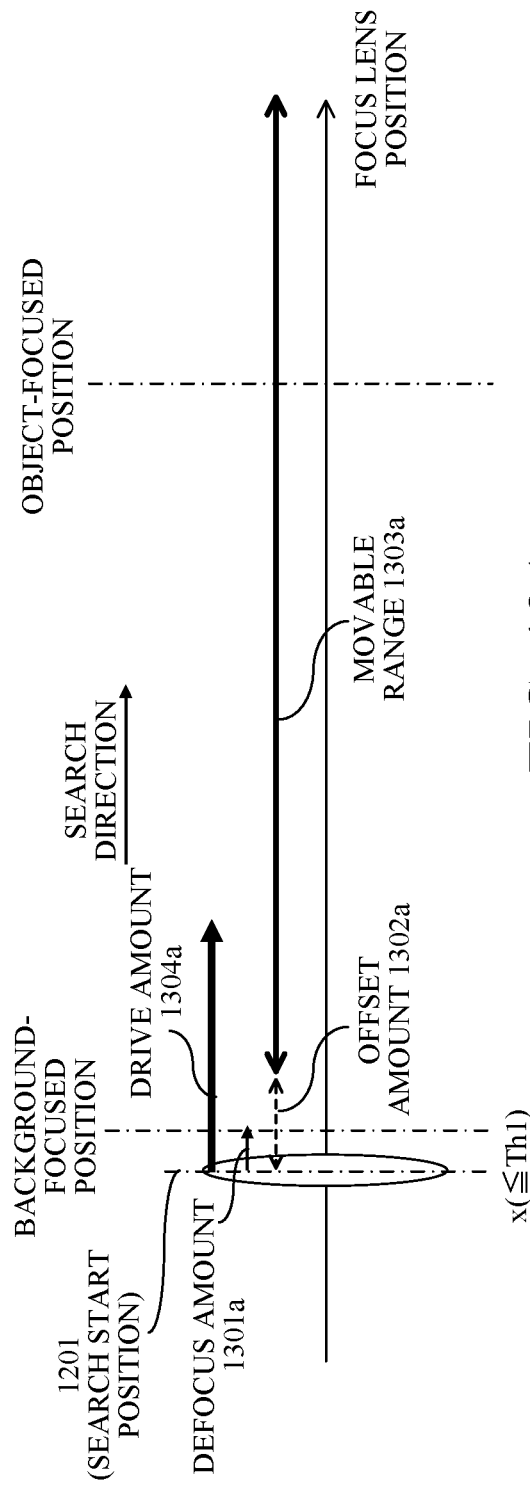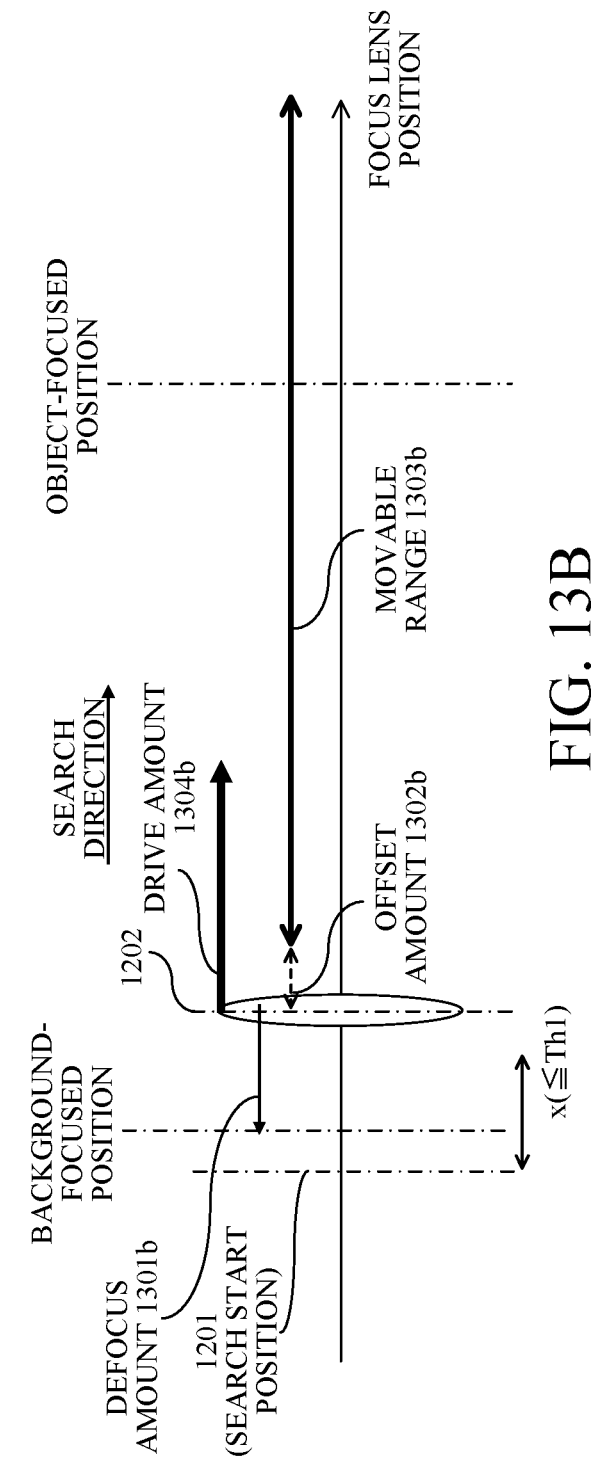

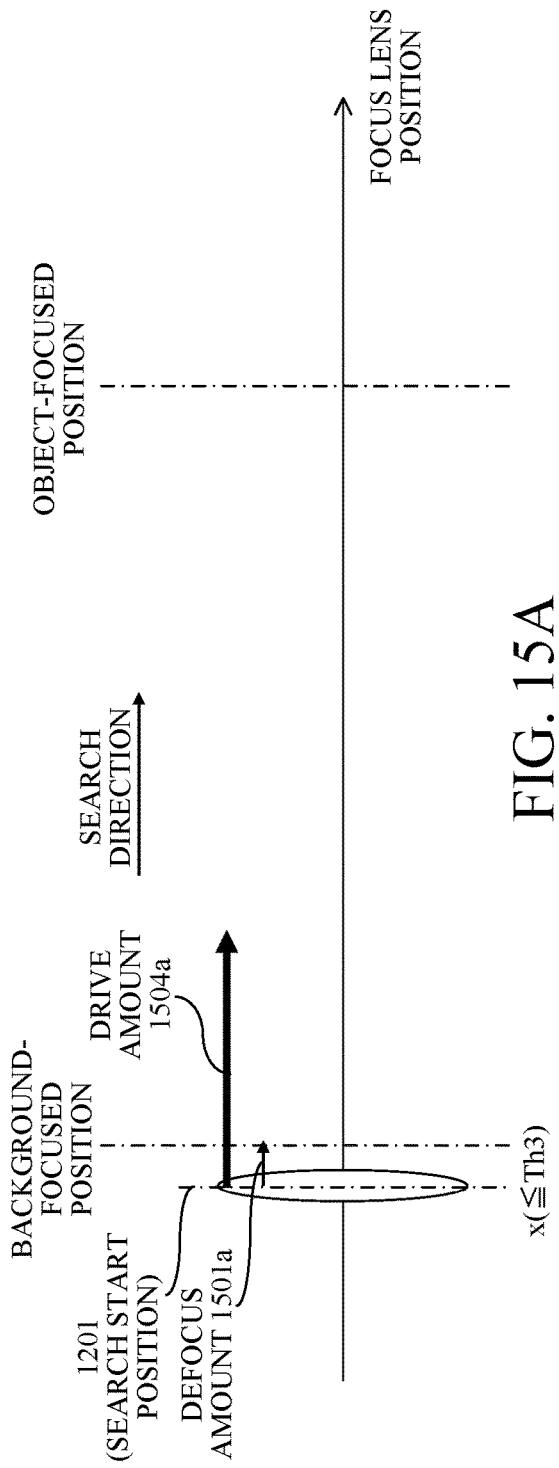

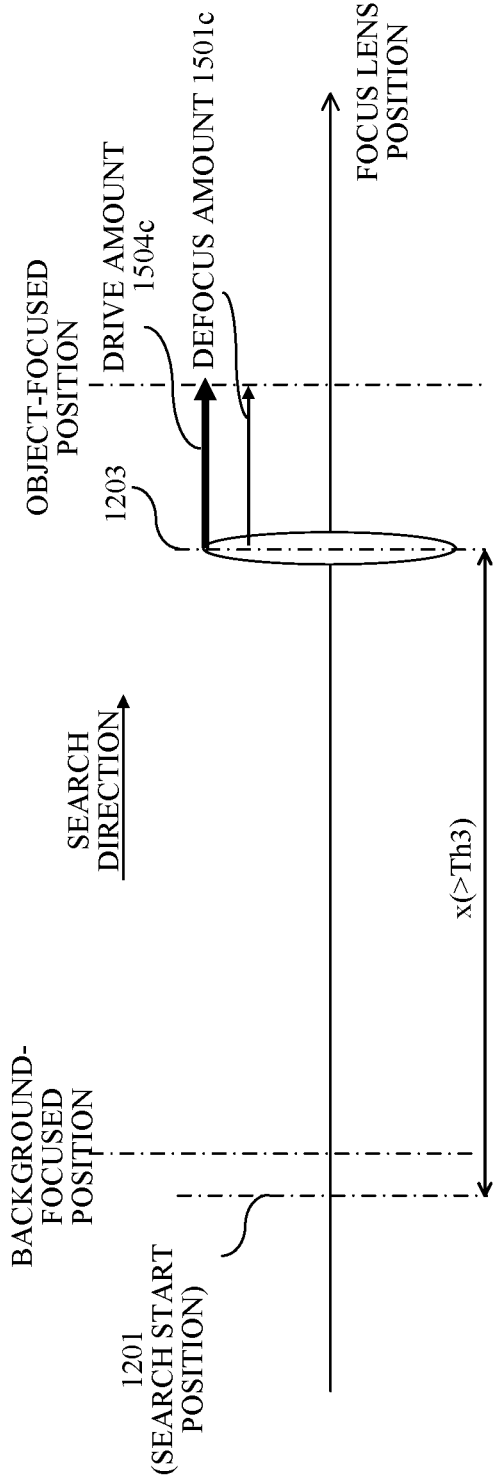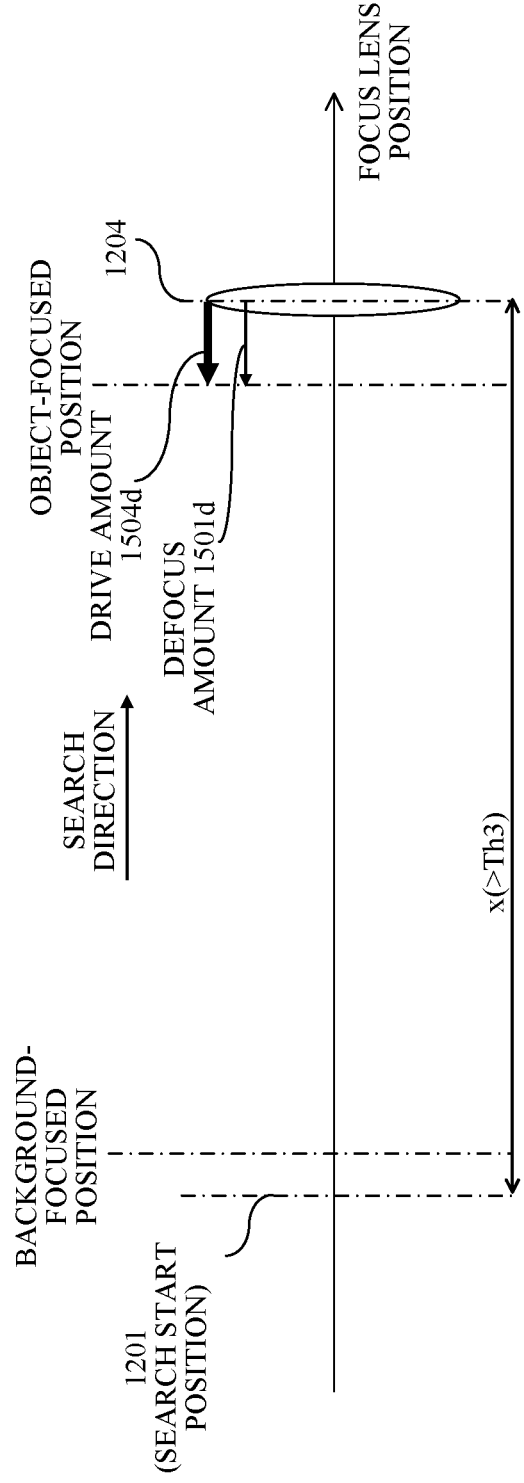

FOCUS CONTROL APPARATUS, IMAGE PICKUP APPARATUS, AND FOCUS CONTROL METHOD

BACKGROUND

Technical Field

One of the aspects of the embodiments relates to a focus adjustment (focus) control.

Description of Related Art

Some image pickup apparatuses perform a search operation in which a focus lens is moved to search for an in-focus position. Japanese Patent Laid-Open No. 2007-164051 discloses a method of performing the search operation limited to a far side of a near side endpoint or a near side of a far side endpoint, respectively, according to a user's designation of a current lens position as the near side endpoint or the far side endpoint as a starting position for the search operation.

However, the method disclosed in Japanese Patent Laid-Open No. 2007-164051 is based on a focus adjustment control using a contrast detecting method. If the method in Japanese Patent Laid-Open No. 2007-164051 is applied to a focus adjustment control using a phase-difference detecting method, there is a risk that near a start position of the search operation, a defocus amount near the start point is detected and the start position of the search operation is refocused based on the defocus amount. As a result, it is not possible to perform an appropriate search operation to quickly focus on an object desired by the user.

SUMMARY

A focus control apparatus according to one aspect of the embodiment includes a memory configured to store instructions, and a processor configured to execute the instructions, the processor being configured to preform a focus detection using a phase-difference detecting method, and control a drive of a focus lens included in an optical system based on a focus detection result acquired by the focus detection. The processor sets, in a search operation of acquiring the focus detection result while driving the focus lens in a search direction, a movable range of the focus lens based on the search direction and a position of the focus lens, in a case where the focus detection result for a position within the movable range is acquired, drives the focus lens based on the focus detection result, and in a case where the focus detection result for a position outside the movable range is acquired, drives the focus lens in the search direction without using the focus detection result.

Further features of the disclosure will become apparent from the following description of embodiments with reference to the attached drawings.

BRIEF DESCRIPTION OF THE DRAWINGS

FIGS. 13A, 13B, 13C, and 13D are diagrams each illustrating a relationship among a search direction, a search start position, a focus lens position, a movable range of a focus lens, a defocus amount, and a focus lens drive amount according to the first embodiment.

FIGS. 15A, 15B, 15C, and 15D are diagrams each illustrating a relationship among a search direction, a search start position, a focus lens position, a defocus amount, and a focus lens drive amount according to the second embodiment.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
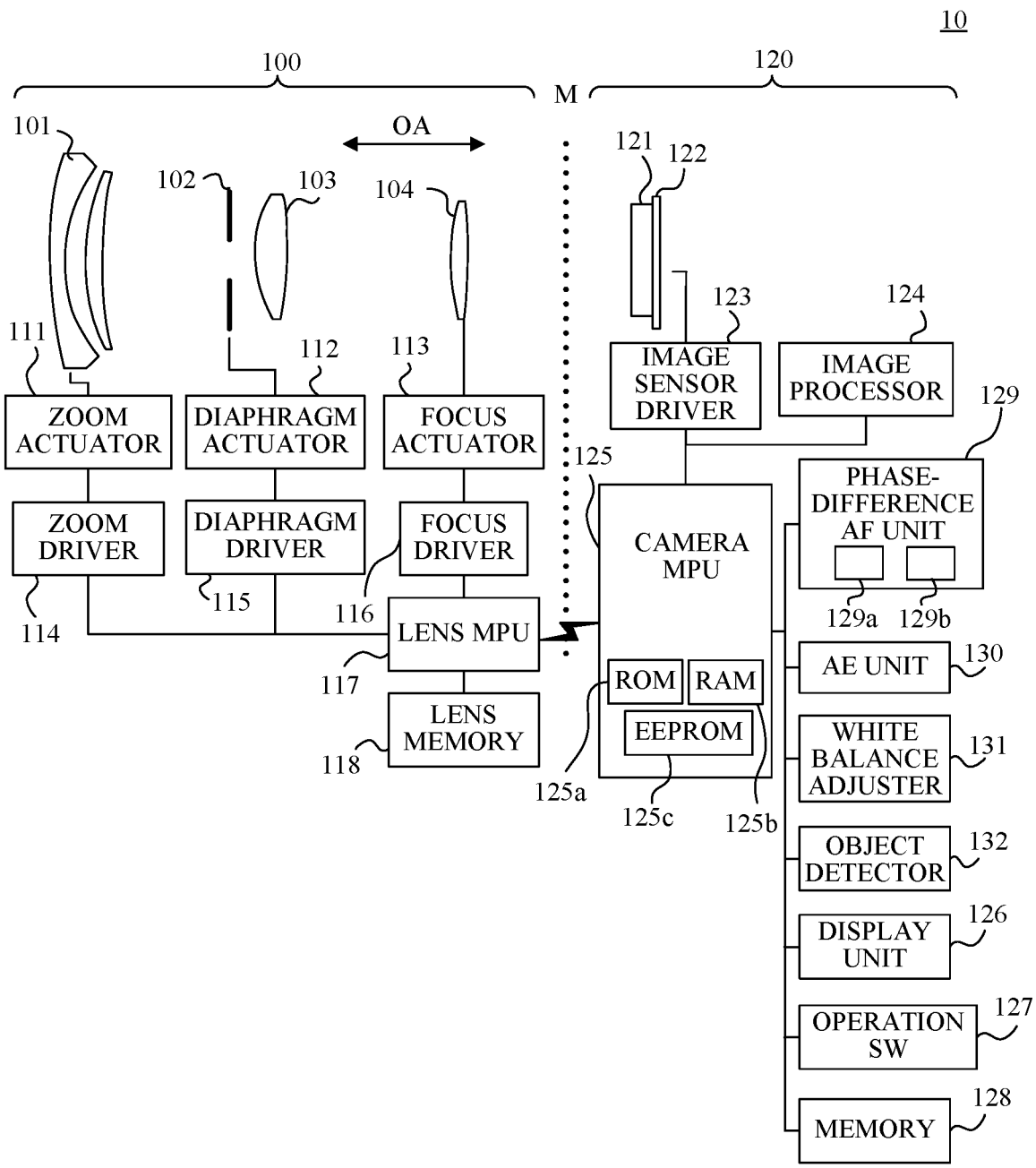
FIG. 1 is a block diagram illustrating a configuration of an image pickup apparatus according to a first embodiment.

The image pickup system 10 according to the first embodiment shown in FIG. 1 is a lens-interchangeable single-lens reflex digital camera system that can perform autofocus using an imaging plane phase-difference detecting method (hereinafter referred to as imaging plane phase-difference AF). This embodiment and the second embodiment described later are applicable to a digital camera with an integrated lens and a digital video camera, and can also be applied to terminal devices such as tablets and smartphones, and various image pickup apparatuses such as monitoring cameras, car-mounted cameras, and medical cameras.

<Apparatus Configuration>

The image pickup system 10 consists of a lens unit 100 and a camera body 120 as an image pickup apparatus. The lens unit 100 is detachably connected to the camera body 120 via a mount M, indicated by a dotted line in the center of the figure.

The lens unit 100 has an image pickup optical system that includes a first lens group 101, a diaphragm 102, a second lens group 103, and a focus lens group (hereinafter referred to as focus lens) 104.

The first lens group 101 is disposed closet to an object in the lens unit 100 and is held so as to be movable in an optical axis direction OA. In the following, the optical axis direction OA is referred to as a Z direction, and a direction from a camera side to an object side is referred to as a positive direction. In this embodiment, an origin O of an axis in the Z direction corresponds to a position of an image sensor 122 in the camera body 120, which will be described later.

The diaphragm 102 adjusts a light amount by changing its opening diameter. The diaphragm 102 also functions as a mechanical shutter that controls an exposure time when a still image is captured. The diaphragm 102 and the second lens group 103 are movable in the optical axis direction OA as a single unit and move in conjunction with the first lens group 101 to achieve a zoom function.

The focus lens 104 is movable in the optical axis direction OA, and an object distance at which the lens unit 100 is focused (in-focus distance) changes according to its position. In this embodiment, the autofocus is achieved by controlling a position of the focus lens 104 in the optical axis direction OA.

The lens unit 100 has a drive/control system (including an equipment, a circuitry, a program code, and other items). Among the drive/control system, the drive system includes a zoom actuator 111, a diaphragm/shutter actuator 112, a focus actuator 113, a zoom driver 114, a diaphragm/shutter driver 115, and a focus driver 116. The control system that controls the drive system includes a lens MPU 117 and a lens memory 118.

The zoom actuator 111 drives the first lens group 101 and the second lens group 103 back and forth in the optical axis direction OA to perform a zoom control to change an angle of view of the image pickup optical system. The diaphragm/shutter actuator 112 controls the opening diameter of the diaphragm 102 to adjust the light amount, and controls an opening and closing movement of the diaphragm 102 to control the exposure time when an image is captured. The focus actuator 113 drives the focus lens 104 back and forth in the optical axis direction OA to perform the autofocus and also has a function of detecting a current position (actual position) of the focus lens 104, The zoom driver 114 drives the zoom actuator 111 in response to a zoom operation by a user or a control value of the lens MPU 117. The diaphragm/shutter driver 115 drives the diaphragm/shutter actuator 112. The focus driver 116 drives the focus actuator 113.

The lens MPU 117 performs calculations related to the image pickup optical system and controls the zoom driver 114, the diaphragm/shutter driver 115, the focus driver 116, and lens memory 118. The lens MPU 117 can communicate commands and data with a camera MPU 125 via the mount M. For example, the lens MPU 117 detects the current position of the focus lens 104 and notifies the camera MPU 125 of lens position information in response to a request from the camera MPU 125. The lens position information includes a position of the focus lens 104 in the optical axis direction OA, a position and diameter of an exit pupil in the optical axis direction OA, and a position and diameter of a lens frame that limits a light beam of the exit pupil in the optical axis direction OA.

The lens MPU 117 also controls the zoom driver 114, the diaphragm/shutter driver 115, and the focus driver 116 in response to a request from the camera MPU 125. The lens memory 118 stores in advance optical information necessary for the imaging plane phase-difference AF. The lens memory 118 also stores, for example, a defocus map that indicates a correspondence between a position or movement amount of the focus lens 104 and the defocus amount. The defocus map is generated by calculating the defocus amount at each pixel position of the image sensor 122, which will be described later. When the lens MPU 117 receives a request from the camera MPU 125 to change the defocus amount by a predetermined amount, the lens MPU 117 refers to the defocus map stored in the lens memory 118. The lens MPU 117 controls the focus actuator 113 to move the focus lens 104 by a distance corresponding to the predetermined amount.

The camera MPU 125 controls operations of the lens unit 100 by executing programs stored in a ROM 125a and the lens memory 118. The lens memory 118 also stores optical information and other information on the image pickup optical system.

The camera body 120 has an optical low-pass filter 121, the image sensor 122, and a drive/control system described later. The optical low-pass filter 121 reduces false colors and moires in a captured image.

The image sensor 122, for example, consists of a CMOS image sensor and its peripheral circuitry. The CMOS image sensor has a photoelectric conversion element in each pixel that receives light, and has a pixel group (imaging plane) in which a plurality of unit pixels are arranged in a two-dimensional array, with each pixel as a unit pixel. The image sensor 122 has a plurality of focus detection pixels that receive light beams passing through different pupil areas of the image pickup optical system, respectively, and is capable of output signals independently for each pixel. This enables detection (calculation) of the defocus amount by the imaging plane phase-difference AF. The image sensor 122 has a plurality of image pickup pixels that generate an image signal of an object by receiving light beams passing through an entire area of the exit pupil of the image pickup optical system that forms an image of the object.

The drive/control system of the camera body 120 has an image sensor driver 123, an image processor 124, the camera MPU 125, a display unit 126, an operation switch 127, a memory 128, and a phase-difference AF unit 129. The drive/control system of the camera body 120 also has an AE unit 130, a white balance adjuster 131, and an object detector 132.

The image sensor driver 123 controls a charge accumulation operation of the image sensor 122, converts an image signal read out from the image sensor 122 into a digital signal and sends the digital signal to the camera MPU 125. The image processor 124 performs various image processing such as a gamma conversion, a color interpolation, and a JPEG compression on the image signal read out from the image sensor 122. The image processor 124 also generates a signal for the imaging plane phase-difference AF described later (focus detection signal), a signal for an exposure adjustment, a signal for white balance adjustment, and a signal for an object detection.

The camera MPU 125 as a controller is a computer having at least one microprocessor. The camera MPU 125 performs operations related to the camera body 120 and controls the image sensor driver 123, the image processor 124, the display unit 126, the operation switch 127, the memory 128, and the phase-difference AF unit 129. The camera MPU 125 can communicate with the lens MPU 117 via signal lines disposed on the mount M. This causes the camera MPU 125 to issue, to the lens MPU 117, a request to acquire a lens position, a request for a zoom drive, a diaphragm drive, or a lens drive at a predetermined drive amount, or a request to acquire optical information specific to the lens unit 100.

The camera MPU 125 contains a ROM 125a that stores a program for controlling camera operations, a RAM 125b that stores variables, and an EEPROM 125c that stores various parameters. The camera MPU 125 reads the program stored in the ROM 125a, expands it in the RAM 125b, and executes a focus adjustment process, an object detection process, an exposure adjustment process, and a white balance adjustment process according to the program.

The display unit 126 has a display device such as an LCD (liquid crystal) panel or an organic EL, and displays various information about an operation mode set in the camera body 120. The operation mode includes a still image capturing mode, a moving image capturing mode, and a playback mode, which plays back captured images stored in the memory 128.

The operation switch 127 includes a shutter switch, a power switch, a zoom switch, a mode switching switch, and a search switch (instruction means). The memory 128 is a flash memory that can be attached to or detached from the camera and records captured images.

The phase-difference AF unit 129 as a focus detector performs a focus detection using the imaging plane phase-difference detecting method based on a focus detection signal as a pair of image signals with parallax to each other for the focus detection obtained from the image sensor 122 and the image processor 124. Specifically, the image processor 124 calculates an image shift amount (phase difference) between a pair of phase-difference image data generated from the pair of focus detection signals by performing a correlation calculation on the pair of phase-difference image data. Then, the image processor 124 converts the image shift amount into a defocus amount to detect the defocus amount. The phase-difference AF unit 129 performs a focus adjustment (AF) process that controls a position of the focus lens 104 using the detected defocus amount (focus detection result). The phase-difference AF unit 129 may perform a focus detection using a phase-difference detecting method with a focus detection sensor separate from the image sensor 122, instead of the imaging plane phase-difference detecting method.

The phase-difference AF unit 129 in this embodiment has a signal generation block 129a that generates first and second focus detection signals described below and a calculation block 129b that calculates a phase difference between the first and second focus detection signals and also calculates a defocus amount from the phase difference. At least part of the phase-difference AF unit 129 (part of the signal generation block 129a or calculation block 129b) may be provided in the camera MPU 125. An AF process (focus control process) executed by the camera MPU 125 and the phase-difference AF unit 129 is described later. The camera MPU 125 and the phase-difference AF unit 129 constitute a focus control unit.

The object detector 132 performs an object detection process to detect a type, part, and state of an object (detection type), and a position and size of the object (detection area), based on a signal for an object detection generated by the image processor 124.

The AE unit 130 controls an exposure condition by performing photometry based on a signal for an exposure adjustment obtained from the image sensor 122 and the image processor 124. Specifically, an exposure amount at a currently set aperture value, shutter speed, and ISO sensitivity is calculated, and an appropriate aperture value, shutter speed, and ISO sensitivity for image capturing are calculated based on a difference between the calculated exposure amount and a predetermined appropriate exposure amount, and are set as the exposure condition. This provides an automatic exposure adjustment (AE).

The white balance adjuster 131 performs a white balance adjustment process based on a signal for a white balance adjustment obtained from the image sensor 122 and the image processor 124. Specifically, the white balance adjuster 131 adjusts a color weighting based on a difference between a white balance parameter obtained from the signal for the white balance adjustment and a predetermined appropriate white balance parameter. This provides an automatic white balance adjustment (AWB).

The camera body 120 in this embodiment can perform AF, AE, and AWB in combination with the object detection, and can select a position where AF, AE, and AWB are performed in a range to be captured according to the object detection result.

<Image Sensor Configuration>

Figure 2:
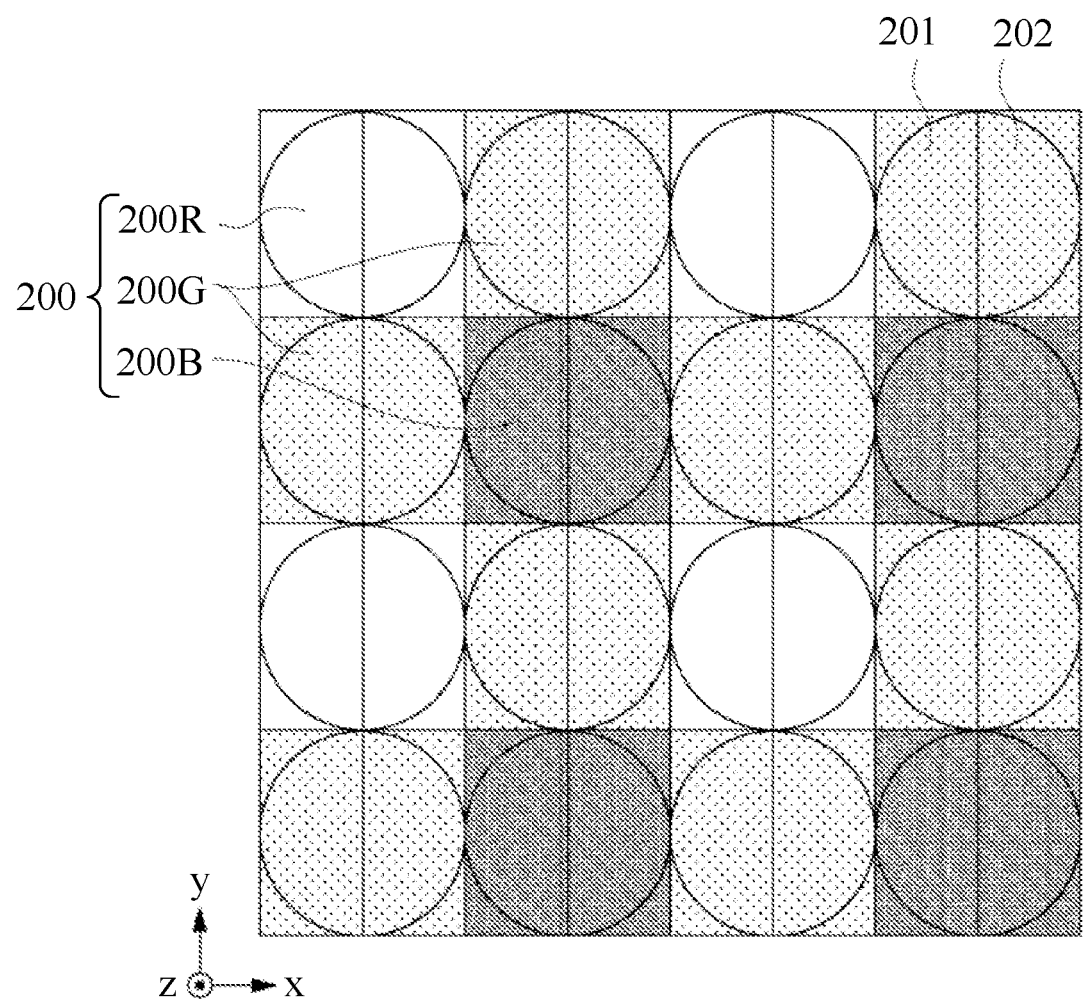
FIG. 2 is a diagram illustrating a pixel array of an image sensor according to the first embodiment.

FIG. 2 shows an arrangement of image pickup pixels in the image sensor 122 as a two-dimensional CMOS sensor in a range of 4 columns by 4 rows, and an arrangement of focus detection pixels in a range of 8 columns by 4 rows. In an image pickup pixel group of 2 columns×2 rows shown in FIG. 2, the image pickup pixel 200R with R (red) spectral sensitivity is located in the upper left, the image pickup pixels 200G with G (green) spectral sensitivity are located in the upper right and lower left, and an image pickup pixel 200B with B (blue) spectral sensitivity is located in the lower right. Furthermore, each image pickup pixel is composed of a first focus detection pixel 201 and a second focus detection pixel 202 arranged in two rows by one column. By arranging a large number of such image pickup pixel groups 200 on the imaging plane, it is possible to acquire a captured image and a focus detection signal.

Figure 3A:
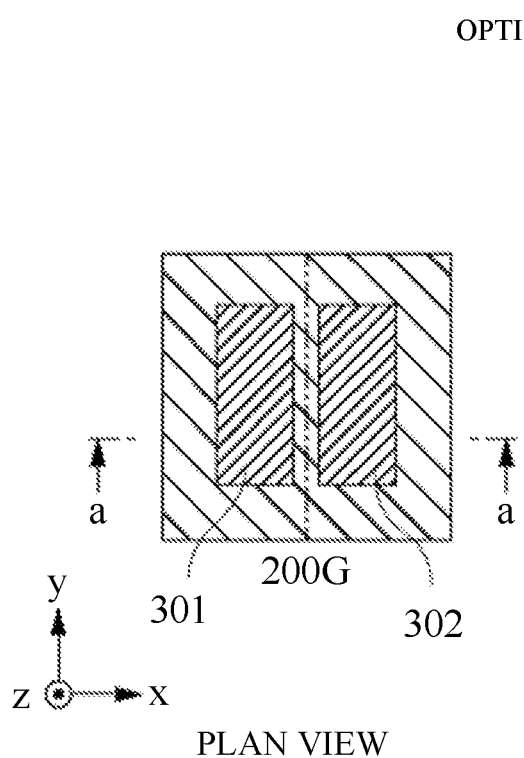
FIGS. 3A and 3B are a plan view and a cross-sectional view of a pixel according to the first embodiment, respectively.
Figure 3B:
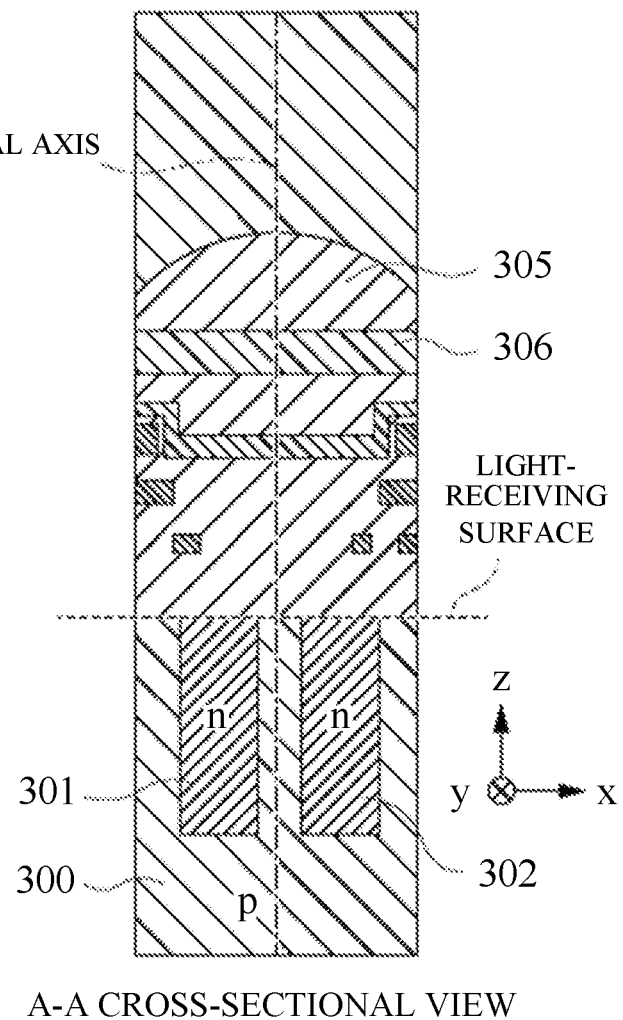

FIG. 3A illustrates one image pickup pixel (hereinafter simply called pixel) 200G of the image sensor 122 shown in FIG. 2, viewed from a light-receiving side (+z side) of the image sensor 122. FIG. 3B illustrates the a-a cross section of FIG. 3A from the −y side.

The pixel 200G has a microlens 305 for condensing incident light and a photoelectric converter 301 and a photoelectric converter 302, which are divided into two sections in the x direction. The photoelectric converter 301 and the photoelectric converter 302 correspond to the first focus detection pixel 201 and the second focus detection pixel 202, respectively, shown in FIG. 2.

The photoelectric converter 301 and the photoelectric converter 302 may be pin-structured photodiodes with an intrinsic layer between a p-type layer and an n-type layer, or they may be pn-junction photodiodes with the intrinsic layer omitted. The pixel 200G has a color filter 306 between the microlens 305 and the photoelectric converters 301 and 302. A spectral transmittance of the color filter may be changed for each photoelectric converter, or the color filter may be omitted.

Light incident on the pixel 200G is condensed by the microlens 305, spectrally split by the color filter 306, and then received by the photoelectric converter 301 and the photoelectric converter 302. In the photoelectric converter 301 and the photoelectric converter 302, pairs of electrons and holes are generated according to received light amount, and after being separated by a depletion layer, the negatively charged electrons are accumulated in the n-type layer, while the holes are discharged to the outside of the image sensor 122 through the p-type layer connected to a constant voltage source (not shown).

The electrons accumulated in the n-type layers of the photoelectric converter 301 and the photoelectric converter 302 are transferred to a capacitance unit (FD) through a transfer gate and converted into a voltage signal.

Figure 4:
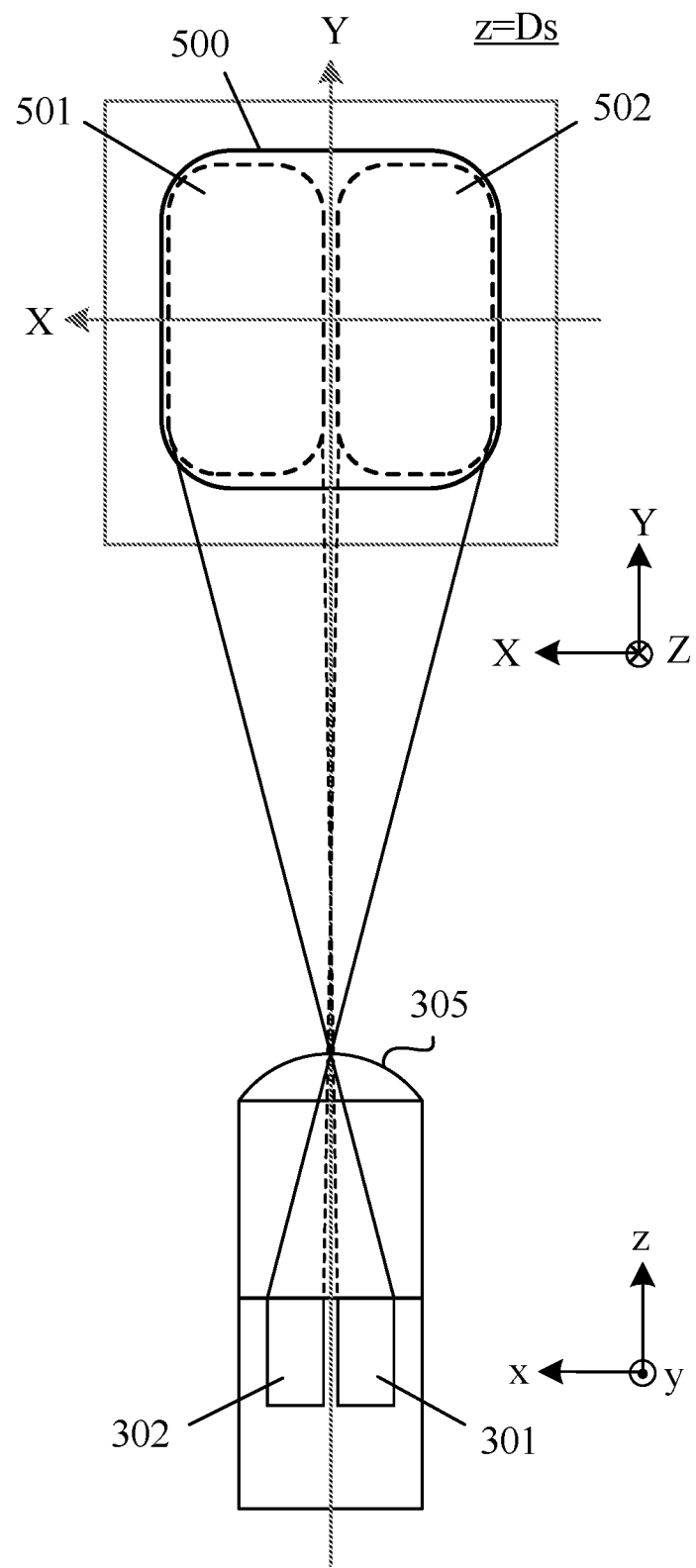
FIG. 4 is a diagram for explaining a pupil division according to the first embodiment.

FIG. 4 illustrates the correspondence between the pixel structure of the image sensor 122 shown in FIGS. 3A and 3B and a pupil division. FIG. 4 shows a cross section of the pixel structure of the image sensor 122 shown in FIG. 3A from the ty side and a pupil plane of the image sensor 122 (pupil distance Ds). In FIG. 4, the x- and y-axes of the cross section of the image sensor 122 are shown inverted with respect to FIGS. 3A and 3B to correspond with the coordinate axes of the pupil plane of the image sensor 122.

In FIG. 4, a first pupil partial area 501 is an area in which the first focus detection pixel 201 can receive light, which is approximately conjugated by the microlens 305 to a light receiving surface of the photoelectric converter 301 whose center of gravity is decentered in the −x direction. A second pupil partial area 502 is an area in which the second focus detection pixel 202 can receive light, which is approximately conjugated by the microlens 305 to a light receiving surface of the photoelectric converter 302 whose center of gravity is decentered in the +x direction. In FIG. 4, a pupil area 500 including the first pupil partial area 501 and the second pupil partial area 502 is an area in which the entire pixel 200G combined with the photoelectric converters 301 and 302 (first and second focus detection pixels 201 and 202) can receive light.

Figure 5:
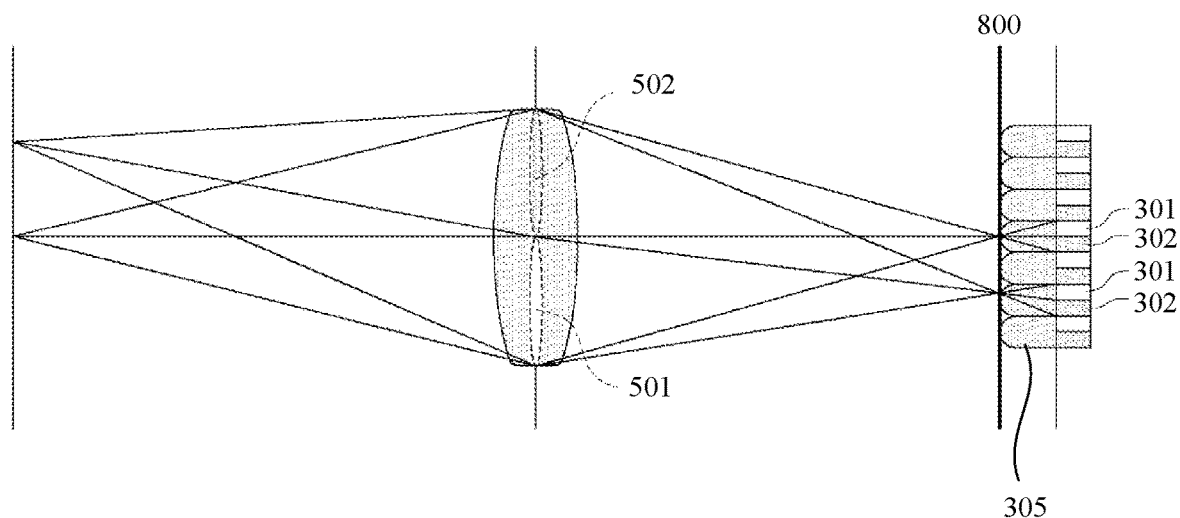
FIG. 5 is a diagram for explaining a relationship between the image sensor and the pupil division according to the first embodiment.

As shown in FIG. 5, light beams passing through the first pupil partial area 501 and the second pupil partial area 502, which are mutually different, in the pupil area 500 of the image pickup optical system enter the respective pixels on the imaging plane 800 at angles different from each other and are received by the first focus detection pixel 201 and the second focus detection pixel 202, respectively. FIG. 5 shows an example where the pupil area is divided into two pupils in a horizontal direction, but it may also be divided vertically. The light beams passing through the pupil area 500 are received by the first focus detection pixel 201 and the second focus detection pixel 202 in the respective pixels.

A first focus detection signal is generated by combining photoelectric conversion signals from the first focus detection pixels 201 of multiple pixels, and a second focus detection signal is generated by combining photoelectric conversion signals from the second focus detection pixels 202. In each pixel, the photoelectric conversion signals from the first and second focus detection pixels 201 and 202 are added and the photoelectric conversion signals from all pixels are combined to generate an image pickup signal with a resolution of N effective pixels. The second focus detection signal may be generated by subtracting the first focus detection signal from the image pickup signal.

<Relationship Between Defocus Amount and Image Shift Amount>

Figure 6:
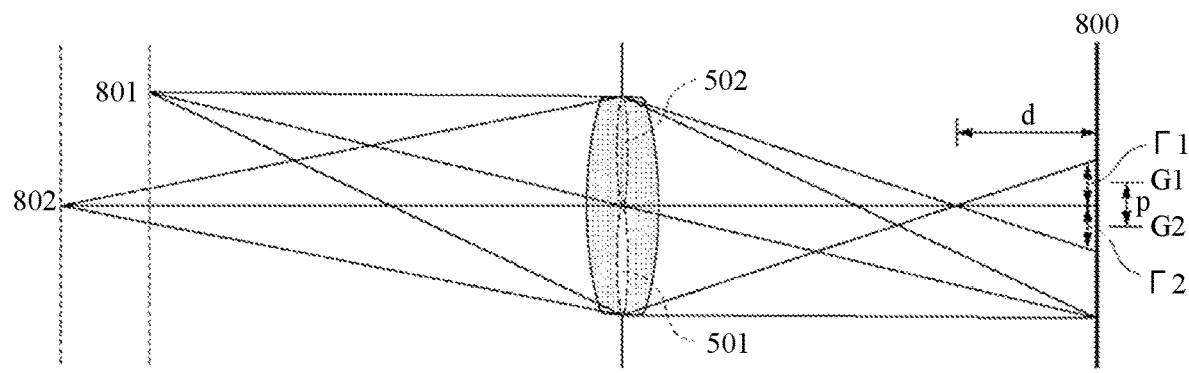
FIG. 6 is a diagram for explaining a relationship between a defocus amount and an image shift amount according to the first embodiment.

FIG. 6 illustrates the relationship between the defocus amount and the image shift amount between the first and second focus detection signals. As shown in FIG. 5, the pupil area of the image pickup optical system is divided into two pupil areas: the first pupil partial area 501 and the second pupil partial area 502. The defocus amount d is defined as a distance from an imaging position of the object image to the imaging plane 800, and a front focus state in which the imaging position of the object image is closer to the object than the imaging plane 800 is indicated by a negative sign (d<0). A positive sign (d>0) indicates a rear focus state in which the imaging position of the object image is farther from the object than the imaging plane 800. In an in-focus state in which the imaging position of the object image is on the imaging plane 800, d=0. In FIG. 6, an object 801 indicates an object in the in-focus state (d=0), and an object 802 indicates an object in the front focus state (d<0). The front focus state (d<0) and the rear focus state (d>0) together are called a defocus state (|d|>0).

In the front focus state (d<0), among the light beams from the object 802, the light beams that have passed through the first and second pupil partial areas 501 and 502 are condensed once and then spread to widths Γ1 and Γ2 centered on the center of gravity positions G1 and G2 of the light beams, respectively, resulting in a blurred image on the imaging plane 800. The blurred image is received by the first and second focus detection pixels 201 and 202, which generate the first and second focus detection signals. Therefore, the first and second focus detection signals are recorded as object images in which the object 802 is blurred with the widths Γ1 and Γ2 at the center of gravity positions G1 and G2 on the imaging plane 800, respectively. The blur widths Γ1 and Γ2 of the object image generally increase roughly proportionally as the magnitude |d| of the defocus amount d increases. Similarly, the magnitude |p| of the image shift amount p between the first and second focus detection signals (difference G1-G2 in the center of gravity positions of the light beams), also increases roughly proportionally as the magnitude |d| of the defocus amount d increases. The same is true for the rear focus state (d>0), except that an image shift direction between the first and second focus detection signals is opposite to that in the front focus state.

The phase-difference AF unit 129 converts, based on a relationship that the image shift amount between the first and second focus detection signals increases as the defocus amount increases, the image shift amount to the defocus amount d by a conversion coefficient calculated based on the distance (baseline length) between the first and second focus detection pixels 201 and 202.

<Image Pickup Process>

Figure 7:
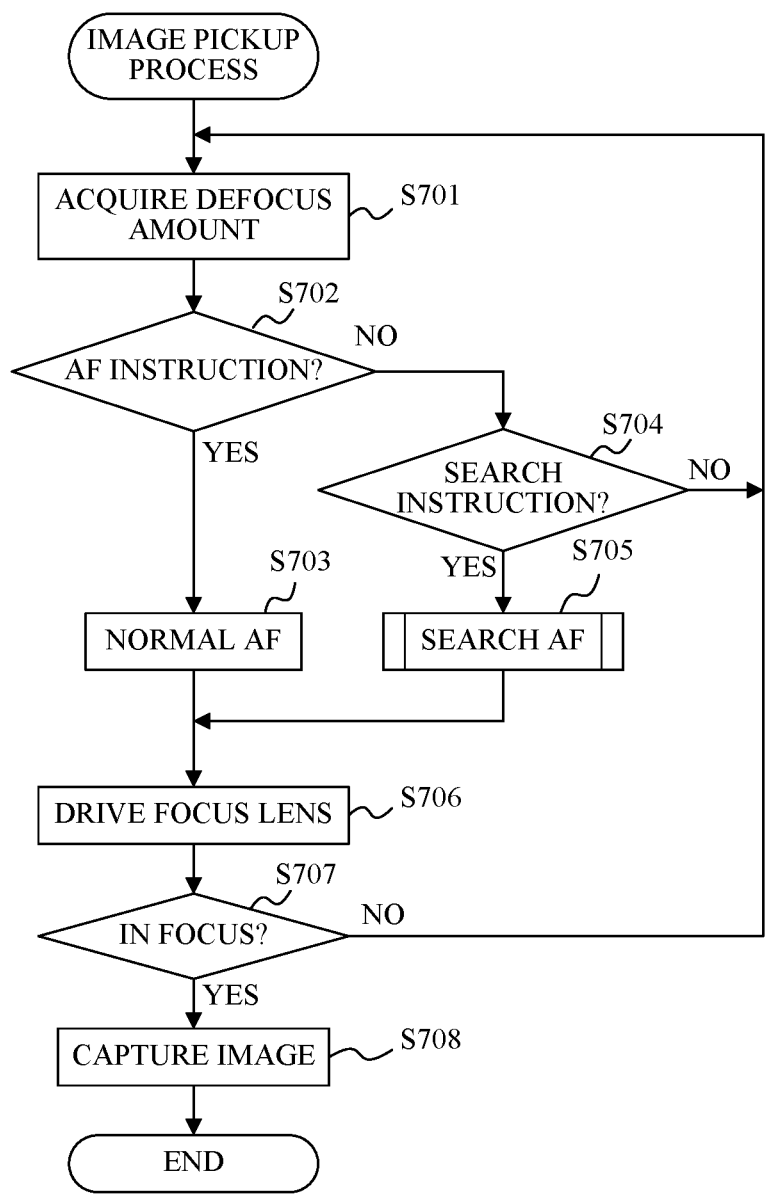
FIG. 7 is a flowchart illustrating an image pickup process according to the first embodiment.

The flowchart in FIG. 7 shows the image pickup process that the camera MPU 125 executes according to the program in this embodiment.

In the step S701, the camera MPU 125 causes the phase-difference AF unit 129 to perform the focus detection and acquires the defocus amount as the focus detection result.

Next, in the step S702, the camera MPU 125 determines whether or not an AF instruction is received, and in a case where the AF instruction is received, the flow proceeds to the step S703; in a case where the AF instruction is not received, the flow proceeds to the step S704.

In the step S703, the camera MPU 125 executes a normal AF (imaging plane phase-difference AF) process and sets a drive amount of the focus lens 104 (hereinafter referred to as focus drive amount) according to the defocus amount acquired in the step S701. Then, the flow proceeds to the step S706.

In the step S704, the camera MPU 125 determines whether or not a search instruction is given by a user's operation of the search switch of the operation switch 127. The search instruction includes an instruction to start a search AF process and an instruction for a search direction (drive direction of the focus lens 104). In a case where the search instruction is given, the flow proceeds to the step S705, and in a case where the search instruction is not given, the flow proceeds to the step S701.

In the step S705, the camera MPU 125 executes the search AF process and then the flow proceeds to the step S706. The search AF process is described later.

In the step S706, the camera MPU 125 sends the focus drive amount set in the step S703 or the step S705 to the lens MPU 117 to drive the focus lens 104.

In the step S707, the camera MPU 125 determines whether or not the image pickup optical system is focused on the object, and in a case where the camera MPU 125 determines that the object is in focus, the flow proceeds to the step S708, and in a case where the camera MPU 125 determines that the object is not in focus, the flow proceeds to the step S701.

In the step S708, the camera MPU 125 executes image capturing for recording. When the image capturing is completed, this process is ended.

<Search AF Process>

Figure 8:
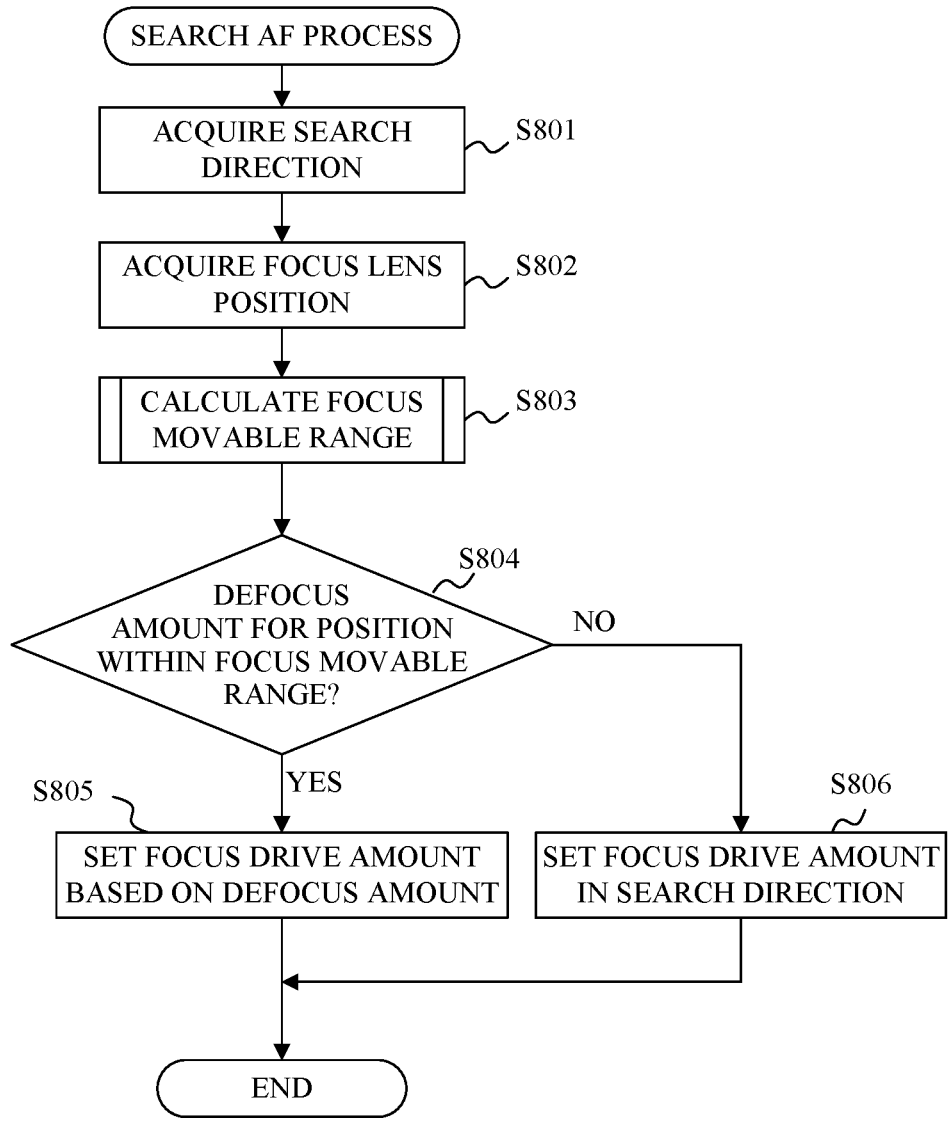
FIG. 8 is a flowchart illustrating a search AF process according to the first embodiment.

The flowchart in FIG. 8 shows the search AF process (focus control method) executed in the step S705. In the search AF (process), a search operation (hereinafter simply referred to as search) is performed to perform the focus detection at a predetermined cycle while moving the focus lens 104 to search for an in-focus position of the focus lens 104. The focus lens 104 is then moved to the in-focus position specified by the search.

In the step S801, the camera MPU 125 acquires the search direction in the search instruction determined in the step S704 of FIG. 7.

Next, in the step S802, the camera MPU 125 acquires a current position (search start position) of the focus lens 104 from the lens MPU 117.

Next, in the step S803, the camera MPU 125 calculates a movable range of the focus lens 104 (hereinafter referred to as focus movable range). The calculation of the focus movable range is described later.

Next, in the step S804, the camera MPU 125 determines whether or not the defocus amount acquired in the step S701 of FIG. 7 is a defocus amount for a position within the focus movable range calculated in the step S803. In other words, the camera MPU 125 determines whether or not a target position of the focus lens 104 is within the focus movable range in a case where the focus lens 104 is driven by the focus drive amount based on the defocus amount. In a case where the defocus amount for the position within the focus movable range is acquired (the target position is within the focus movable range), the flow proceeds to the step S805, and in a case where the defocus amount is not a defocus amount for the position within the focus movable range, the flow proceeds to the step S806. Here, in a case where the defocus amount is not reliable enough to be used, it is determined that the defocus amount is not within the focus movable range.

In the step S805, the camera MPU 125 sets the focus drive amount based on the defocus amount acquired in the step S701. Then, this process is ended.

In the step S806, the camera MPU 125 sets a predetermined focus drive amount in the search direction acquired in the step S801, without using the defocus amount acquired in the step S701. The predetermined focus drive amount is a drive amount during the search, and may be set according to a cycle of the focus detection, an image pickup distance, an aperture value, an image pickup mode, and the like. After the step S806, the process is ended.

<Calculation of Focus Movable Range>

Figure 10:
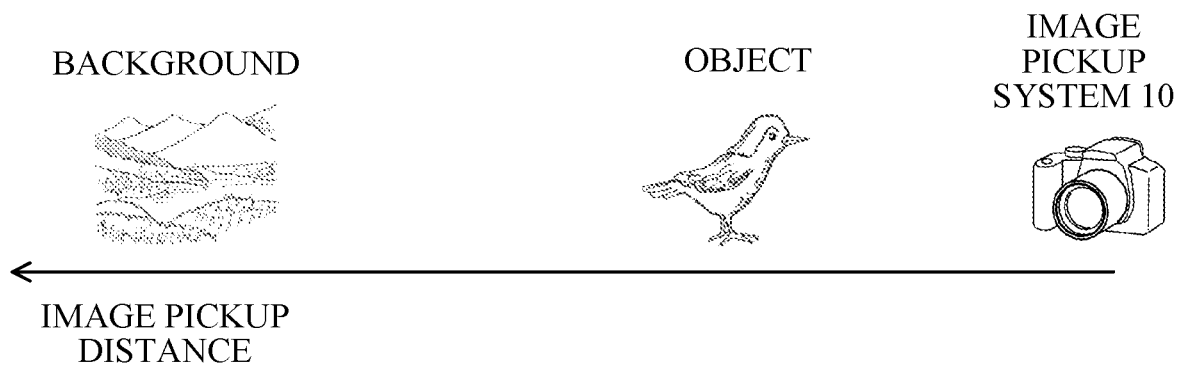
FIG. 10 is a diagram illustrating a positional relationship between an object and a background according to the first embodiment.

The calculation of the focus movable range in the step S803 of FIG. 8 is explained. FIG. 10 shows a positional relationship between the object and the background. The object is located at a position close to the image pickup system 10 and the background is located far enough away from the image pickup system 10.

Figure 11A:
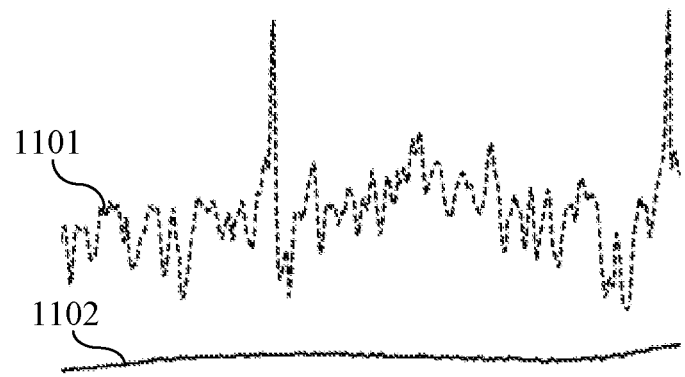
FIGS. 11A and 11B are diagrams illustrating signals of an object and a background according to the first embodiment.
Figure 11B:
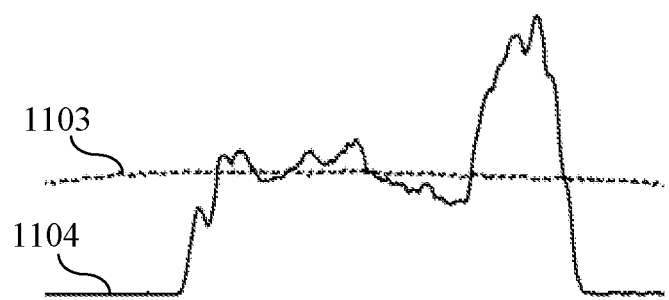

FIGS. 11A and 11B show a signal indicating the object (hereinafter referred to as "object signal") and a signal indicating the background (hereinafter referred to as "background signal"), these signals being acquired from the image sensor 122 when the object and the background are in the positional relationship shown in FIG. 10. FIG. 11A shows the object signal 1102 and the background signal 1101 when the image pickup optical system is focused on the background. FIG. 11B shows the object signal 1104 and the background signal 1103 when the image pickup optical system is focused on the object. In reality, the object signal and the background signal are acquired from the image sensor 122 as a signal in which they are added, but here the object signal and the background signal are shown separately.

In a background-focused state shown in FIG. 11A, a contrast of the background signal 1101 is high and a contrast of the object signal 1102 is very low. Therefore, the background signal 1101 greatly affects the background-focused state, and the defocus amount relative to the background is detected as the focus detection result. On the other hand, in an object-focused state shown in FIG. 11B, a contrast of the object signal 1104 is high and a contrast of the background signal 1103 is very low. Therefore, the object signal 1104 greatly affects the object-focused state, and the defocus amount relative to the object is detected as the focus detection result.

Figure 12:
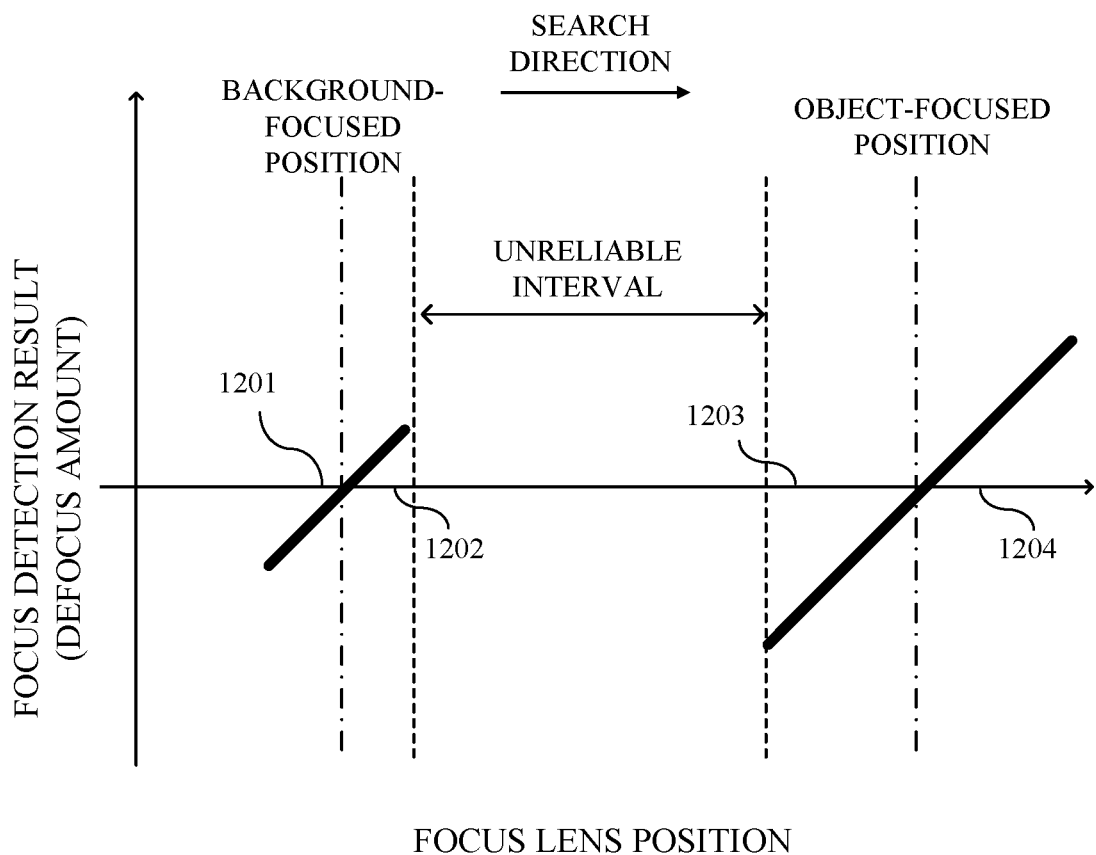
FIG. 12 is a diagram illustrating a relationship between a focus lens position and a defocus amount according to the first embodiment.

FIG. 12 shows a relationship between the focus lens position and the focus detection result when the object and the background are in the positional relationship shown in FIG. 10. A horizontal axis indicates the focus lens position and a vertical axis indicates the defocus amount. The search direction is a direction from a long (background) side to a short (object) side of the in-focus image pickup distance.

When the focus lens position is in the vicinity of a background-focused position (1201, 1202), the defocus amount relative to the background is detected, which is greatly affected by the background signal as described above. On the other hand, when the focus lens position is in the vicinity of an object-focused position (1203, 1204), the defocus amount relative to the object is detected, which is greatly affected by the object signal. In a section between the vicinity of the background-focused position and the vicinity of the object-focused position, both the background signal and the object signal have low contrast, so that a reliability of the defocus amount is low and the defocus amount that can be used for AF cannot be detected.

Figure 9:
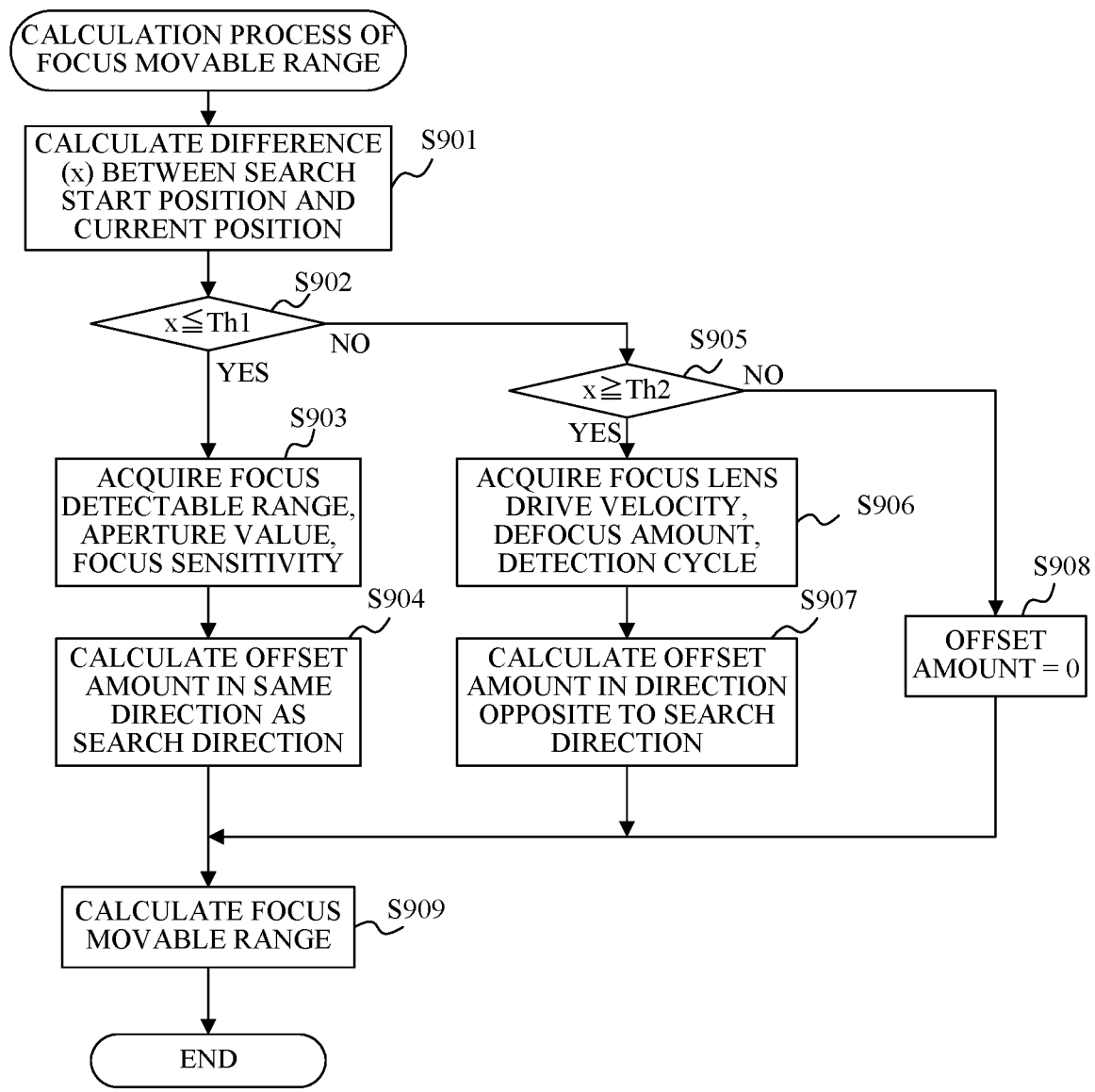
FIG. 9 is a flowchart illustrating a process of calculating a movable range of a focus lens according to the first embodiment.

The flowchart in FIG. 9 shows a calculation process of the focus movable range. In the step S901, the camera MPU 125 calculates a difference x between the search start position of the focus lens 104 acquired in the step S802 at the start of the search AF (search start) and the current position of the focus lens 104 acquired in the step S802 at the current frame.

Next, in the step S902, the camera MPU 125 determines whether or not the difference x is less than or equal to a predetermined first threshold value Th1, and in a case where the difference x is less than or equal to the first threshold value Th1, the flow proceeds to the step S903, and in a case where the difference x is larger than the first threshold value Th1, the flow proceeds to the step S905.

In the step S903, the camera MPU 125 acquires a focus detectable range of the phase-difference AF unit 129, and further acquires the aperture value and focus sensitivity (optical information of the image pickup optical system) being set from the lens MPU 117. The focus detectable range is an image blur amount (spread amount of the object image) detectable by the phase-difference AF unit 129. The focus sensitivity indicates a relationship (ratio) between a unit drive amount of the focus lens 104 and an amount of change in the defocus amount.

Next, in the step S904, the camera MPU 125 calculates an offset amount in the same direction as the search direction acquired in the step S801, based on the difference x calculated in the step S901 and the focus detectable range R, aperture value F and focus sensitivity S acquired in the step S903. The offset amount is a drive amount of the focus lens 104 calculated by considering a case where the search start position is in a direction opposite to the search direction relative to the background-focused position, and is calculated, for example, by the following formula (1). Here, a indicates a predetermined gain value.

$$\text{Offset amount} = \alpha(R/x)FS$$

When an image blur amount exceeding the focus detectable range occurs for an object in the vicinity of the search start position, the focus detection result for the object cannot be obtained, so that there is no need to set an offset amount that causes the image blur amount exceeding the focus detectable range. Therefore, in such cases, the offset amount is set based on the focus detectable range.

As the current position of the focus lens 104 moves away from the search start position, the possibility that the current position exceeds the background-focused position increases. For this reason, by decreasing the offset amount as the current position moves away from the search start position so as to be inversely proportional to the difference x between the search start position and the current position, an excessively large offset amount is prevented from being set. The aperture value F is used for conversion from the image blur amount to the defocus amount, and the focus sensitivity is used for conversion from the defocus amount to the focus drive amount. The formula (1) is an example of a formula for calculating the offset amount, and the offset amount may be calculated by other methods. From the step S904, the flow proceeds to the step S909.

In the step S909, the camera MPU 125 calculates the focus movable range based on the current position of the focus lens 104, the offset amount calculated in the step S904, and the search direction acquired in the step S801. The focus movable range is a range from a position shifted (separated) from the current position in the search direction by the offset amount to a drive end (control end or mechanical end) of the focus lens 104 in the search direction. The camera MPU 125 that has calculated the focus movable range ends this process.

FIGS. 13A, 13B, 13C, and 13D each illustrates a relationship among the search direction, the search start position, the focus lens position, the focus movable range, the defocus amount, and the focus drive amount. The focus positions (current positions) 1201-1204 in the figures correspond to the positions 1201-1204 shown in FIG. 12.

FIG. 13A shows a state at the search start, where the focus lens 104 is positioned at the search start position as the current position 1201. Since x(=0)≤Th1 in this state, the offset amount 1302a is set in the same direction as the search direction based on the focus detectable range, the aperture value, the focus sensitivity and x (step S904). The focus movable range 1303a is set in the search direction from a position shifted in the search direction from the search start position by the offset amount 1302a. In this state, the defocus amount 130a up to the background-focused position is detected. However, the background-focused position as the target position of the focus lens 104 based on the defocus amount 130a is outside the focus movable range 1303a. For this reason, the defocus amount 130a is not used, and a predetermined amount for the search is set as the focus drive amount 1304a (step S806).

In this way, the focus movable range shifted by the offset amount in the search direction from the search start position (current position) is set. As a result, even if the search start position is located in the direction opposite to the search direction relative to the background-focused position, the object-focused position can be searched without focusing on the background.

FIG. 13B shows a state in which the focus lens 104 has moved from the search start position to the current position 1202 closer to the object-focused position than the background-focused position. Since x(>0)≤Th1 in this state as well, the offset amount 1302b is set in the same direction as the search direction based on the focus detectable range, the aperture value, the focus sensitivity, and x (step S904). The focus movable range 1303b is set in the search direction from a position shifted from the current position 1202 by the offset amount 1302b. Since x is larger than the state in FIG. 13A, the offset amount 1302b is smaller than the offset amount 1302a. Even in this state, the defocus amount 1301b up to the background-focused position is detected. However, the background-focused position as the target position of the focus lens 104 based on the defocus amount 1301b is outside the focus movable range 1303b. For this reason, the defocus amount 1301b is not used, and a predetermined amount for the search is set as the focus drive amount 1304b (step S806). Although the focus drive amount 1304b is the same as the focus drive amount 1304a shown in FIG. 13A, the focus drive amount 1304b may be smaller than or different from the focus drive amount 1304a.

In this way, the focus movable range shifted by the offset amount from the focus lens position after the search start is set. This makes it possible to search for the object-focused position without focusing on the background, even if the detected defocus amount 1301a is for a position within the focus movable range (1303a) set at the search start.

In the step S905 in FIG. 9, the camera MPU 125 determines whether or not the difference x is greater than or equal to a predetermined second threshold value Th2 (>Th1), and in a case where the difference x is greater than or equal to the threshold value Th2, the flow proceeds to the step S906, and in a case where the difference x is smaller than the threshold value Th2, the flow proceeds to the step S908.

In the step S906, the camera MPU 125 acquires a drive velocity of the focus lens 104 and a focus detection cycle.

Next, in the step S907, the camera MPU 125 calculates the offset amount in the direction opposite to the search direction acquired in the step S801 based on the drive velocity and focus detection cycle acquired in the step S906, as well as the difference x calculated in the step S901. The offset amount here is a relationship between the drive velocity v of the focus lens 104 and the focus detection cycle T, and is set in consideration of the case where the object-focused position is overshot during the search, and is calculated, for example, by the following formula (2). β is a predetermined gain value.

$$\text{Offset amount} = \beta vTx$$

The drive amount of the focus lens 104 between frames in which the focus detection is performed is calculated by the product of the drive velocity v and the focus detection cycle T. Since the drive amount of the focus lens 104 between the above frames is the maximum amount by which the object-focused position is overshot, the offset amount is set based on this drive amount. As the position of the focus lens 104 is far away from the search start position, the possibility that the position of the focus lens 104 overshoots the object-focused position becomes high. For this reason, by increasing the offset amount in proportion to the difference x between the search start position and the current position of the focus lens 104, the object-focused position can be easily captured within the movable range even in the case of overshooting. That is, since the possibility of overshooting at the search start is low, the movable range is narrowed to reduce the risk of returning to the background. When the position of the focus lens 104 is far away from the search start position, the risk of returning to the background decreases and the risk of overshooting increases. For this reason, by widening the movable range in the search start direction, it is easy to bring the object-focused position within the drivable range even in the case of overshooting. The method for calculating the offset amount described above is merely an example, and other methods may be used for calculation. For example, the offset amount (that is, the focus movable range) may be set based on only one of the drive velocity of the focus lens 104 and the focus detection cycle.

On the other hand, in the step S908, the camera MPU 125 sets the offset amount to zero. Then, the flow proceeds to the step S909 to calculate the focus movable range as described above, and the process is ended.

Figure 13C:
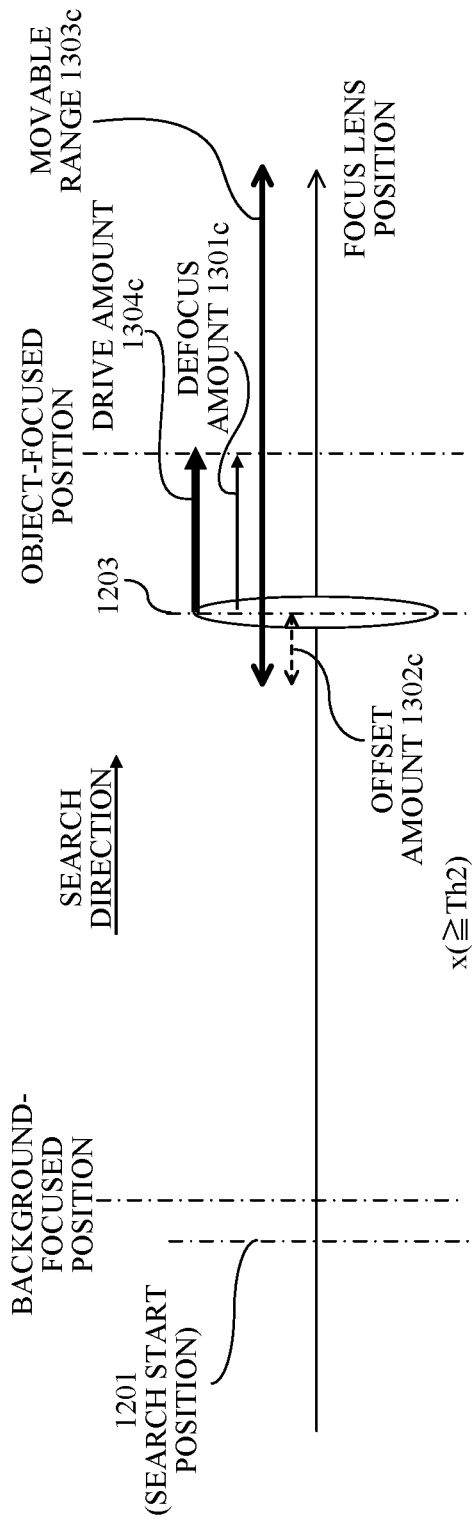

FIG. 13C shows a state in which the focus lens 104 has moved to the current position 1203 closer to the object-focused position than in the state in FIG. 13B. In this state, since x≥Th2, the offset amount 1302c is set in the direction opposite to the search direction based on the drive velocity of the focus lens 104, the focus detection cycle, and the difference x (step S907). The focus movable range 1303c is set in the search direction from a position shifted from the current position 1203 by the offset amount 1302c in the direction opposite to the search direction. In this state, the defocus amount 1301c up to the object-focused position is detected, and the object-focused position as the target position of the focus lens 104 based on the defocus amount 1301c is within the focus movable range 1303c. For this reason, the focus drive amount 1304c is set based on the defocus amount 1301c (step S805).

In this way, the focus movable range is set in the search direction from the position shifted by the offset amount in the direction opposite to the search direction from the current position of the focus lens 104. This makes it possible to focus on the object by driving the focus lens 104 based on the defocus amount detected at a timing when the object-focused position is within the focus movable range.

Figure 13D:
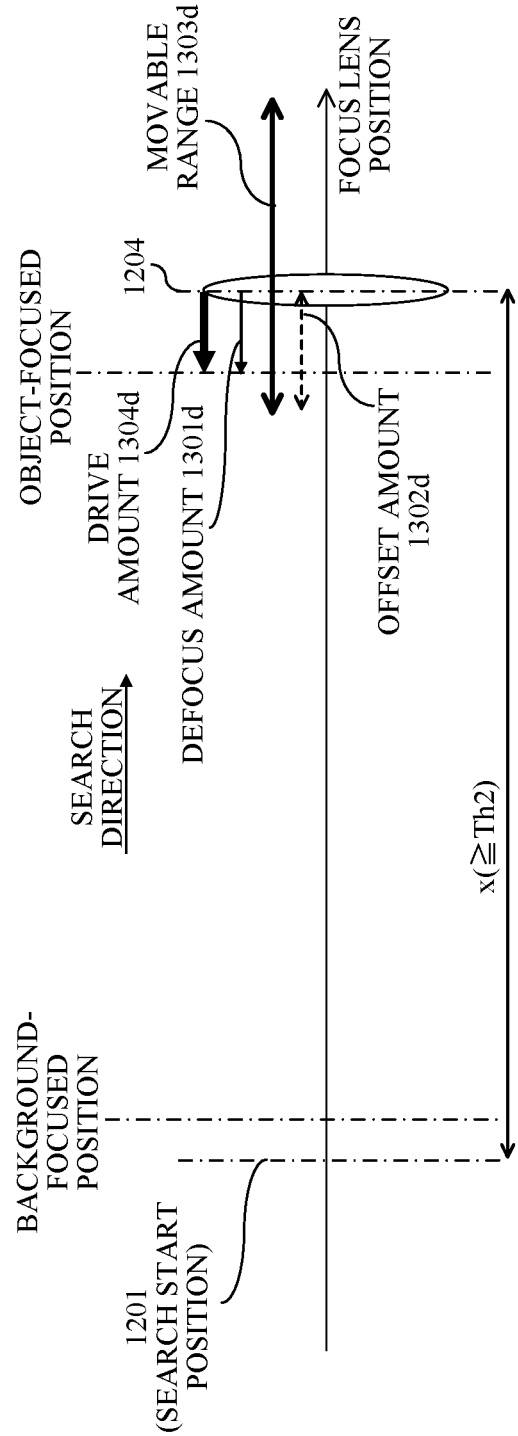

FIG. 13D shows a state in which the focus lens 104 has moved to the current position 1204 that has overshot the object-focused position. Even in this state, since x≥Th2, the offset amount 1302d is set in the direction opposite to the search direction based on the drive velocity of the focus lens 104, the focus detection cycle, and the difference x (step S907). The focus movable range 1303d is set in the search direction from a position shifted from the current position 1204 by the offset amount 1302d in the direction opposite to the search direction. Since the difference x is larger than the state in FIG. 13C, the offset amount 1302d is larger than the offset amount 1302c. In this state, the defocus amount 1301d up to the object-focused position located in the opposite direction to the search direction is detected, and the object-focused position as the target position of the focus lens 104 based on the defocus amount 1301d is within the focus movable range 1303d. For this reason, the focus drive amount 1304d is set based on the defocus amount 1301d (step S806).

In this way, the focus movable range is set in the search direction from the position shifted by the offset amount in the direction opposite to the search direction from the current position of the focus lens 104. As a result, even when the focus lens 104 overshoots the object-focused position in the search direction, the focus lens 104 can be driven based on the defocus amount to focus on the object.

As described above, in this embodiment, the focus movable range is set from the position shifted from the current position of the focus lens 104 by the offset amount. Then, the focus drive amount is set according to whether or not the focus detection result for the position within the focus movable range is acquired. As a result, an appropriate search AF can be performed for an object desired by the user, and the in-focus state for the object can be quickly acquired.

Second Embodiment

Next, the second embodiment will be explained. In the second embodiment, a direction of the defocus amount as the focus detection result (hereinafter referred to as "defocus direction") is determined, and the drive amount of the focus lens is set according to whether or not the defocus direction is the same direction as the search direction, and the search is performed.

The configuration of the image pickup system 10 and the image sensor 122 and the image pickup process in the second embodiment are the same as those in the first embodiment. The positional relationship between the object and the background, the relationship between the object signal and the background signal, as well as the relationship between the focus lens position and the focus detection result are the same as those in the first embodiment.

<Search AF Process>

Figure 14:
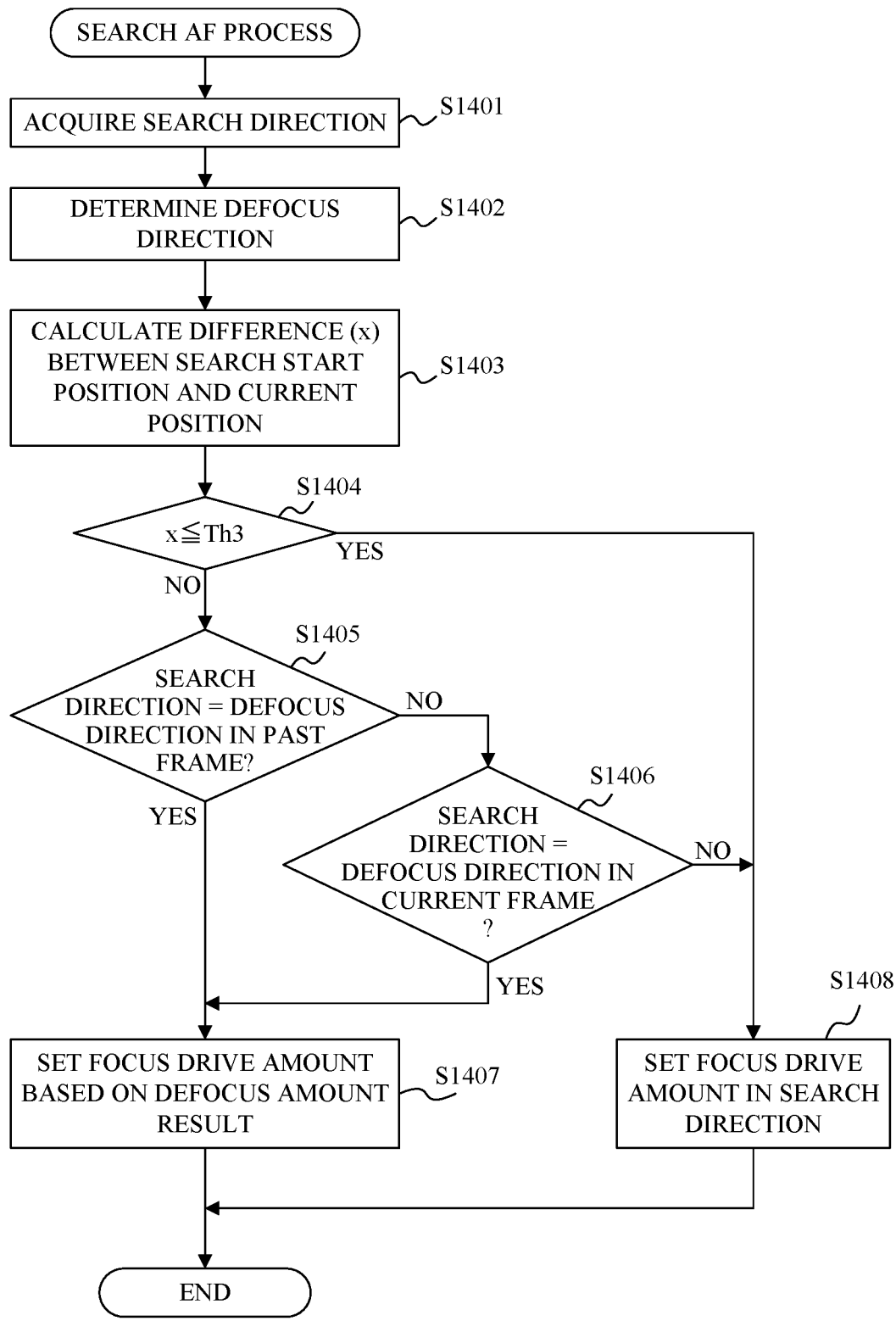
FIG. 14 is a flowchart illustrating a search AF process according to a second embodiment.

FIG. 14 shows the search AF process executed in the step S705 in FIG. 7 in this embodiment. In the step S1401, the camera MPU 125 acquires the search direction in the search instruction determined in the step S704 in FIG. 7.

Next, in the step S1402, the camera MPU 125 determines the defocus direction of the focus detection result acquired in the step S701.

Next, in the step S1403, the camera MPU 125 calculates the difference x between the search start position of the focus lens 104 acquired in the step S802 at the search start and the current position of the focus lens 104 acquired in the step S802 in the current frame.

Next, in the step S1404, the camera MPU 125 determines whether or not the difference x is smaller than or equal to a third threshold value Th3. In a case where the difference x is less than or equal to the third threshold Th3, the flow proceeds to the step S1408, and in a case where the difference x is larger than the third threshold Th3, the flow proceeds to the step S1405.

In the step S1405, the camera MPU 125 determines whether or not the search direction and the defocus direction were in the same direction in the past (e.g., last) frame in the range of x≥Th3 (frame for which a reliable defocus amount could be acquired). In a case where they are in the same direction, the flow proceeds to the step S1407, and in a case where they are not in the same direction, the flow proceeds to the step S1406. This determination takes into consideration the case where the focus lens 104 overshoots the object-focused position during the search. That is, in a case where the search direction and the defocus direction are in the same direction in the past frame (see FIG. 15C described later) and the search direction and the defocus direction are opposite in the current frame (see FIG. 15D), then the object-focused position is considered as overshooting and the flow proceeds to the step S1407. Also, in a case where the search direction and the defocus direction are in the same direction in the past frame and the search direction and the defocus direction are in the same direction in the current frame (the case where the state shown in FIG. 15C continues), the flow proceeds to the step S1407.

In the step S1406, the camera MPU 125 determines whether or not the search direction acquired in the step S1401 and the defocus direction determined in the step S1401 are the same in the current frame. In a case where they are in the same direction, the flow proceeds to the step S1407, and in a case where they are not in the same direction, the flow proceeds to the step S1408. That is, in a case where the search direction and the defocus direction are opposite in the past frame (see FIG. 15B) and the search direction and the defocus direction are the same in the current frame (see FIG. 15C), the flow proceeds to the step S1407. Also, in a case where the search direction and the defocus direction are opposite in the past frame and the search direction and the defocus direction are opposite in the current frame (the case where the state shown in FIG. 15B continues), the flow proceeds to the step S1408.

In the step S1407, the camera MPU 125 sets the focus drive amount based on the defocus amount of the current frame acquired in the step S701. Then, this process is ended.

On the other hand, in the step S1408, the camera MPU 125 sets a predetermined focus drive amount in the search direction acquired in the step S801 without using the defocus amount acquired in the step S701. The predetermined focus drive amount is a drive amount for the search as in the first embodiment, and may be set according to the focus detection cycle, the image pickup distance, the aperture value, the image pickup mode, and the like. Then, the camera MPU 125 ends this process.

FIGS. 15A-15D each shows the relationship among the search direction, the search start position, the focus lens position, the focus movable range, the defocus amount, and the focus drive amount in this embodiment.

FIG. 15A shows a state at the search start, where the focus lens 104 is positioned at the search start as the current position 1201. Since x(=0)≤ Th3 in this state, the defocus amount 1501a to the background-focused position is detected, but the defocus amount 150a is not used and a predetermined amount for the search is set as the focus drive amount 1504a (step S1408).

In this way, in a case where x≤ Th3, the focus drive amount for the search is set without using the detected defocus amount. This makes it possible to search for the object-focused position without focusing on the background, even if the search start position is located in the direction opposite to the search direction relative to the background-focused position.

FIG. 15B shows a state in which the focus lens has moved from the search start position to the current position 1202 closer to the object-focused position than the background-focused position. This state indicates a state where x≥Th3 and the search direction and the defocus direction are opposite in each of the past frame and the current frame within the range of x≥Th3 (NO in the steps S1405 and S1406). For this reason, the defocus amount 1501b up to the background-focused position is detected, but the defocus amount 1501b is not used, and a predetermined amount for the search is set as the focus drive amount 1504b (step S1408).

In this way, when the search direction and the defocus direction are opposite directions, the focus drive amount for the search is set without using the detected defocus amount. This makes it possible to search for the object-focused position without focusing on the background, even when the defocus amount up to the background-focused position is detected.

FIG. 15C shows a state in which the focus lens 104 has moved to the current position 1203 closer to the object-focused position than the state shown in FIG. 15B. In this state, x≥Th3, and in the past frame (FIG. 15B) in the range of the x≥Th3, the search direction and the defocus direction are opposite directions (NO in step S1405), but in the current frame, the search direction and the defocus direction are the same direction (YES in the step S1406). For this reason, the focus drive amount 1504c is set based on the defocus amount 1501c up to the object-focused position detected in the current frame (step S1407).

In this way, when the search direction and the detection direction are the same direction, the focus drive amount is set based on the detected defocus amount. This makes it possible to drive the focus lens 104 to focus on the object based on the defocus amount detected at the timing when the defocus direction becomes the same direction as the search direction.

FIG. 15D shows a state in which the focus lens 104 has moved to the current position 1204, which is past the object-focused position. In this state, x≥Th3, and the search direction and the defocus direction are opposite in the current frame, but the search direction and the defocus direction are the same direction in the past frame (FIG. 15C) in the range of x≥Th3 (Yes in the step S1405). For this reason, the focus drive amount 1504d is set based on the defocus amount 1501d detected in the current frame (step S1407).

In this way, when the search direction and the defocus direction are the same direction in the past frame, the focus drive amount is set based on the detected defocus amount. This makes it possible, even if the focus lens 104 overshoots the object-focused position, to detect the defocus amount up to the object-focused position located in the opposite direction to the search direction, and to drive the focus lens 104 to focus on the object based on the defocus amount.

As described above, according to the second embodiment, the focus drive amount is set according to the determination result of whether or not the search direction and the defocus direction are the same direction. In x≥Th3, after the defocus direction becomes the same direction as the search direction in the past frame, the focus lens 104 is driven based on the defocus amount in the current frame regardless of the defocus direction in the subsequent current frame. As a result, the appropriate search AF can be performed for the object desired by the user, and the in-focus state for the object can be quickly acquired.

In each of the above-described embodiments, the case where the search direction is set in a direction from the long side to the short side of the in-focus image pickup distance to focus on the object while avoiding focusing on the background has been explained. On the other hand, the search AF may be performed in the same manner as in each embodiment by setting the search direction in a direction from the short side to the long side of the image pickup distance. For example, when capturing an image of an animal in a cage, it is possible to focus on the animal in the cage (on the long image pickup distance side) while avoiding focusing on the front of the cage (on the short image pickup distance side).

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

According to the present disclosure, an appropriate search operation can be performed in a focus adjustment using a phase-difference detecting method.

This application claims the benefit of Japanese Patent Application No. 2022-184290, filed on Nov. 17, 2022, which is hereby incorporated by reference herein in its entirety.

What is claimed is:

1. A focus control apparatus comprising:
a memory configured to store instructions; and
a processor configured to execute the instructions, the processor being configured to
preform a focus detection using a phase-difference detecting method, and
control a drive of a focus lens included in an optical system based on a focus detection result acquired by the focus detection,
wherein the processor
sets, in a search operation of acquiring the focus detection result while driving the focus lens in a search direction, a movable range of the focus lens based on the search direction and a position of the focus lens,
in a case where the focus detection result for a position within the movable range is acquired, drives the focus lens based on the focus detection result, and
in a case where the focus detection result for a position outside the movable range is acquired, drives the focus lens in the search direction without using the focus detection result.

2. The focus control apparatus according to claim 1, wherein the processor sets the movable range based on a difference between a start position of the search operation of the focus lens and an actual position of the focus lens.

3. The focus control apparatus according to claim 2, wherein the processor sets the movable range from a position away from the focus lens by an offset amount set based on the difference.

4. The focus control apparatus according to claim 3, wherein the processor
sets the offset amount in a same direction as the search direction in a case where the difference is smaller than a first threshold value, and
sets the offset amount in a direction opposite to the search direction in a case where the difference is larger than a second threshold value that is larger than the first threshold value.

5. The focus control apparatus according to claim 1, wherein the processor sets the movable range based on a detectable blur amount of an object image.

6. The focus control apparatus according to claim 1, wherein the processor sets the movable range based on optical information on the optical system.

7. The focus control apparatus according to claim 1, wherein the processor sets the movable range based on at least one of a drive velocity of the focus lens or a cycle in which the focus detection is performed.

8. The focus control apparatus according to claim 1, further comprising an instruction means for a user to instruct at least one of a direction in which an in-focus image pickup distance is shortened from a long side or a direction in which the in-focus image pickup distance is lengthened from a short side as the search direction.

9. An image pickup apparatus comprising:
a focus control apparatus according to claim 1; and
an image sensor configured to capture an image of an object via the optical system.

10. A focus control apparatus comprising:
a memory configured to store instructions; and
a processor configured to execute the instructions, the processor being configured to
  perform a focus detection using a phase-difference detecting method, and
  control a drive of a focus lens based on a focus detection result acquired by the focus detection,
wherein in a search operation of acquiring the focus detection result while driving the focus lens in a search direction, the processor
  in a case where a difference between a position of the focus lens and a start position of the search operation is larger than a threshold value, and
  in a case where a direction of the focus detection result is a same direction as the search direction, drives the focus lens based on the focus detection result, and
  in a case where the direction of the focus detection result is a direction opposite to the search direction, drives the focus lens in the search direction without using the focus detection result.

11. The focus control apparatus according to claim 10, wherein the processor drives the focus lens based on the focus detection result regardless of the direction of the focus detection result after the direction of the focus detection result becomes the same as the search direction after the difference becomes larger than the threshold value.

12. The focus control apparatus according to claim 10, further comprising an instruction means for a user to instruct at least one of a direction in which an in-focus image pickup distance is shortened from a long side or a direction in which the in-focus image pickup distance is lengthened from a short side as the search direction.

13. A focus control method comprising:
a step of preforming a focus detection using a phase-difference detecting method, and
a step of controlling a drive of a focus lens included in an optical system based on a focus detection result acquired by the focus detection,
wherein
in a search operation of acquiring the focus detection result while driving the focus lens in a search direction, a movable range of the focus lens is set based on the search direction and a position of the focus lens,
in a case where the focus detection result for a position within the movable range is acquired, the focus lens is driven based on the focus detection result, and
in a case where the focus detection result for a position outside the movable range is acquired, the focus lens is driven in the search direction without using the focus detection result.

14. A non-transitory computer-readable storage medium storing a program that causes a computer to execute a process according to a focus control method according to claim 13.

15. A focus control method comprising:
a step of performing a focus detection using a phase-difference detecting method, and
a step of controlling a drive of a focus lens based on a focus detection result acquired by the focus detection,
wherein in a search operation of acquiring the focus detection result while driving the focus lens in a search direction,
  in a case where a difference between a position of the focus lens and a start position of the search operation is larger than a threshold value, and in a case where a direction of the focus detection result is a same direction as the search direction, the focus lens is driven based on the focus detection result, and
  in a case where the direction of the focus detection result is a direction opposite to the search direction, the focus lens is driven in the search direction without using the focus detection result.

* * * * *